United States Patent
Hashimoto et al.

(10) Patent No.: US 9,061,713 B2
(45) Date of Patent: Jun. 23, 2015

(54) VEHICLE BODY FRONT STRUCTURE

(71) Applicants: Syouta Hashimoto, Susono (JP); Hiroshi Kato, Susono (JP); Shintaro Kitakata, Nissin (JP); Atsushi Mikuni, Toyota (JP); Satoshi Funabashi, Nagaizumi-machi (JP); Harutoshi Motojima, Hadano (JP)

(72) Inventors: Syouta Hashimoto, Susono (JP); Hiroshi Kato, Susono (JP); Shintaro Kitakata, Nissin (JP); Atsushi Mikuni, Toyota (JP); Satoshi Funabashi, Nagaizumi-machi (JP); Harutoshi Motojima, Hadano (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/097,795

(22) Filed: Dec. 5, 2013

(65) Prior Publication Data

US 2014/0159420 A1    Jun. 12, 2014

(30) Foreign Application Priority Data

Dec. 7, 2012 (JP) ................................ 2012-268754

(51) Int. Cl.
  *B62D 25/08* (2006.01)
  *B62D 21/15* (2006.01)

(52) U.S. Cl.
  CPC .................................... *B62D 21/152* (2013.01)

(58) Field of Classification Search
  CPC ....... B60R 19/34; B62D 21/15; B62D 21/152
  USPC .............. 296/29, 30, 187.09, 187.1
  See application file for complete search history.

(56) References Cited

U.S. PATENT DOCUMENTS

| | | | | |
|---|---|---|---|---|
| 6,957,846 B2* | 10/2005 | Saeki | .......................... | 296/187.1 |
| 8,177,290 B2* | 5/2012 | Kamimae | ................ | 296/190.08 |
| 8,414,068 B1* | 4/2013 | Na et al. | ................... | 296/193.06 |
| 8,517,453 B2* | 8/2013 | Yoshida | .................... | 296/187.09 |
| 8,596,711 B2* | 12/2013 | Yasui et al. | ............... | 296/187.09 |
| 8,678,484 B2* | 3/2014 | Shono | ....................... | 296/203.03 |
| 8,740,292 B2* | 6/2014 | Kishi | ........................ | 296/203.01 |
| 8,807,632 B2* | 8/2014 | Ramoutar et al. | ........ | 296/187.09 |
| 2009/0256389 A1 | 10/2009 | Kosaka | | |

FOREIGN PATENT DOCUMENTS

| | | |
|---|---|---|
| JP | 2005-67347 | 3/2005 |
| JP | 2006-224728 | 8/2006 |
| JP | 2006-240322 | 9/2006 |
| JP | 2008-213739 | 9/2008 |
| JP | 2010-132122 | 6/2010 |
| JP | 2011-504318 | 11/2011 |
| JP | 2012-166742 | 9/2012 |
| JP | 2012-166743 | 9/2012 |
| JP | 2014-015088 A | 1/2014 |
| JP | 2014-58184 A | 4/2014 |

* cited by examiner

*Primary Examiner* — Dennis H Pedder

(74) *Attorney, Agent, or Firm* — Oblon, McClelland, Maier & Neustadt, L.L.P.

(57) ABSTRACT

A vehicle body front structure includes: a front side member arranged in a vehicle body longitudinal direction at an outer side of a vehicle body front in a vehicle width direction; a protrusion member provided on or to an outer wall of the front side member so as to protrude outward of the outer wall in the vehicle width direction, a rear end portion of the protrusion member being located to a vehicle body rear side of a vehicle body front-side end portion of a power unit arranged to an inner side of the front side member in the vehicle width direction in plan view; and a coupling member having one end portion connected to the rear end portion of the protrusion member and the other end portion connected to the outer wall of the front side member to a vehicle body rear side of the rear end portion.

8 Claims, 12 Drawing Sheets

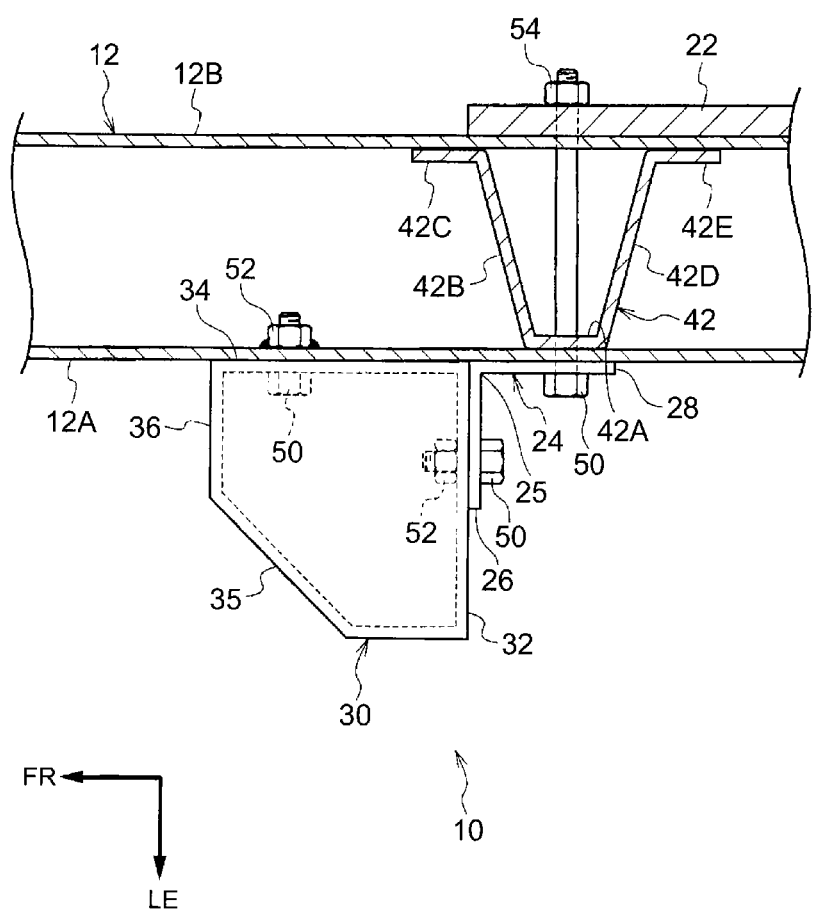

VEHICLE BODY FRONT STRUCTURE

INCORPORATION BY REFERENCE

The disclosure of Japanese Patent Application No. 2012-268754 filed on Dec. 7, 2012 including the specification, drawings and abstract is incorporated herein by reference in its entirety.

BACKGROUND OF THE INVENTION

1. Field of the Invention

The invention relates to a vehicle body front structure.

2. Description of Related Art

There has been suggested a vehicle body front structure in which a load transmitting member is provided at the side portion of each front side member (for example, see Japanese Patent Application Publication No. 2012-166743 (JP 2012-166743 A)). When a frontal collision (small-overlap collision) has occurred to the outer side of any one of the front side members in the vehicle width direction, a corresponding one of the load transmitting members transmits the collision load to a corresponding one of front wheels.

Incidentally, when a frontal collision (small-overlap collision) has occurred to the outer side of any one of the front side members in the vehicle width direction, it is desired to efficiently generate lateral force (force that acts toward the other side of the collision side in the vehicle width direction) in the vehicle in order to suppress a deformation of the vehicle.

SUMMARY OF THE INVENTION

The invention provides a vehicle body front structure that is able to efficiently generate lateral force in a vehicle in the event of a small-overlap collision.

An aspect of the invention provides a vehicle body front structure. The vehicle body front structure includes: a front side member arranged in a vehicle body longitudinal direction at an outer side of a front of a vehicle body in a vehicle width direction; a protrusion member provided on or to an outer wall of the front side member so as to protrude outward of the outer wall in the vehicle width direction, a rear end portion of the protrusion member being located to a vehicle body rear side of a vehicle body front-side end portion of a power unit arranged to an inner side of the front side member in the vehicle width direction in plan view; and a coupling member having one end portion connected to the rear end portion of the protrusion member and the other end portion connected to the outer wall of the front side member to a vehicle body rear side of the rear end portion.

According to the above aspect, the protrusion member is provided on or to the outer wall of the front side member so as to protrude outward of the outer wall in the vehicle width direction, and the rear end portion of the protrusion member is located to the vehicle body rear side of the vehicle body front-side end portion of the power unit arranged to the inner side of the front side member in the vehicle width direction in plan view. The one end portion of the coupling member is connected to the rear end portion of the protrusion member, and the other end portion of the coupling member is connected to the outer wall of the front side member to the vehicle body rear side of the rear end portion.

Thus, when the vehicle has collided with a barrier to the outer side of the front side member in the vehicle width direction (small-overlap collision), the protrusion member collides with the barrier as the vehicle moves forward; however, the rear end portion of the protrusion member is coupled to the outer wall of the front side member by the coupling member, so the protrusion member is hard to fall off from the outer wall of the front side member. Thus, part of the collision load input in the event of the small-overlap collision is transmitted from the protrusion member to the power unit via the front side member. Thus, lateral force is efficiently generated in the vehicle in the event of a small-overlap collision.

In the vehicle body front structure according to the above aspect, a bending strength of the coupling member may be set so as to be lower than a coupling strength of the one end portion with the rear end portion of the protrusion member and a coupling strength of the other end portion with the outer wall of the front side member.

According to the above aspect, the bending strength of the coupling member is set so as to be lower than the coupling strength of the one end portion of the coupling member with the rear end portion of the protrusion member and the coupling strength of the other end portion of the coupling member with the outer wall of the front side member. Thus, the protrusion member is suppressed or prevented from falling off from the outer wall of the front side member in the event of a small-overlap collision.

In the vehicle body front structure according to the above aspect, a front end portion of the protrusion member may be inclined forward and outward of the vehicle body in plan view, and coupling portions each coupling the one end portion to the other end portion are respectively formed at an upper portion and lower portion of the coupling member.

According to the above aspect, the front end portion of the protrusion member is inclined forward and outward of the vehicle body in plan view, and the coupling portions each coupling the one end portion to the other end portion are respectively formed at the upper portion and lower portion of the coupling member. Thus, in the event of a small-overlap collision, the front end portion of the protrusion member early collides with the barrier, and the protrusion member is relatively pushed in so as to be pivoted rearward and inward of the vehicle body by the barrier.

That is, the coupling member of which the stiffness (strength) is improved by the coupling portions early presses the front side member rearward and inward of the vehicle body upon occurrence of a small-overlap collision. Thus, an inward bending deformation of the front side member in the vehicle width direction is facilitated, and part of the collision load input in the event of a small-overlap collision is early transmitted from the front side member to the power unit.

The vehicle body front structure according to the above aspect may further include a load transmitting member provided on one of a vehicle body front side at a side portion of the power unit and an inner wall of the front side member, the inner wall facing the side portion in the vehicle width direction.

According to the above aspect, the load transmitting member is provided on one of the vehicle body front side at the side portion of the power unit and the inner wall of the front side member, the inner wall facing the side portion in the vehicle width direction. Thus, part of the collision load input in the event of a small-overlap collision is early and efficiently transmitted from the front side member to the power unit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is an enlarged cross-sectional plan view that shows the vehicle body front structure according to the first embodiment in which a bulkhead is provided inside the front side member;

DETAILED DESCRIPTION OF EMBODIMENTS

Figure 1:
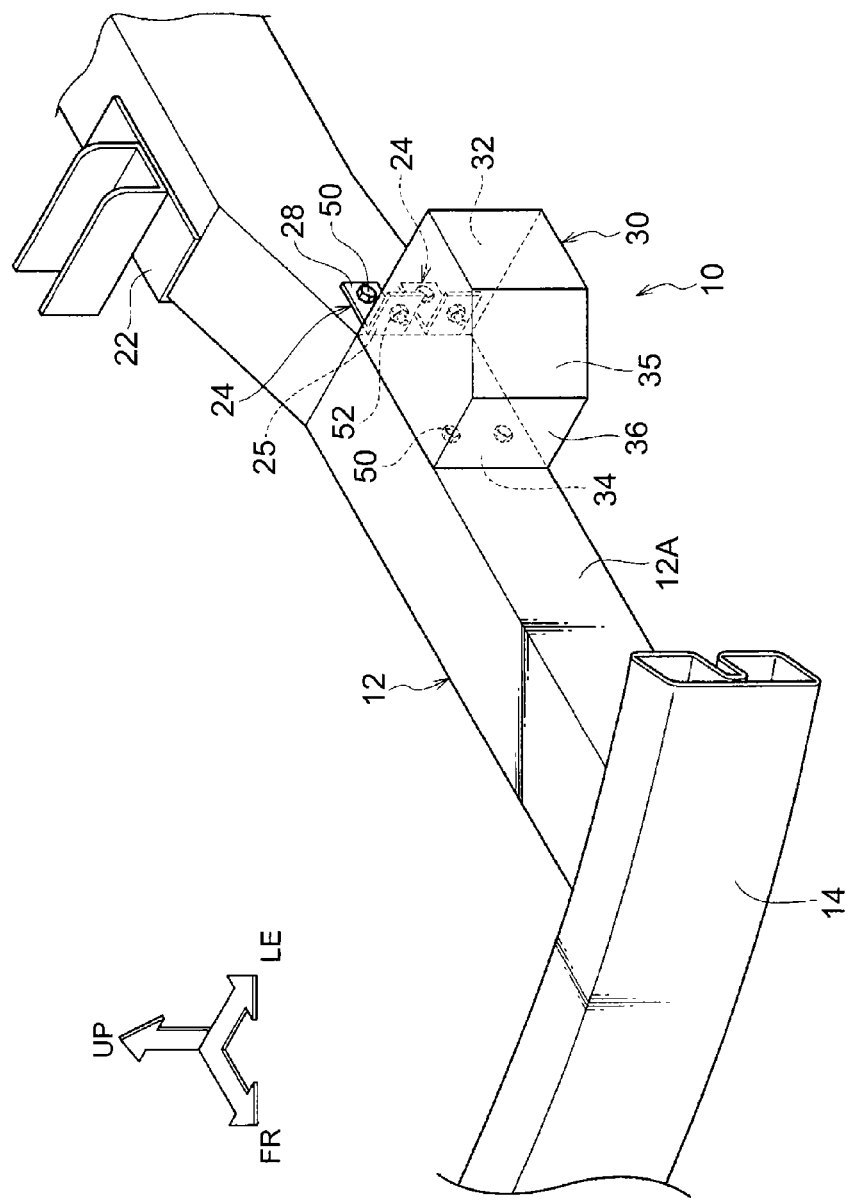
FIG. 1 is an enlarged perspective view that shows a relevant portion of a vehicle body front structure according to a first embodiment.

Hereinafter, embodiments according to the invention will be described in detail with reference to the accompanying drawings. For the sake of convenience of description, the arrow UP, the arrow FR and the arrow LE shown in the drawings where necessary respectively indicate the upper side of a vehicle body, the front side of the vehicle body and the left side of the vehicle body. In the following description, upper and lower sides, front and rear sides and right and left sides respectively indicate upper and lower sides in a vehicle body vertical direction, front and rear sides in a vehicle body longitudinal direction and right and left sides in a vehicle body lateral direction (vehicle width direction) unless otherwise specified. Furthermore, the drawings show the left side of the vehicle body. The description of the right side of the vehicle body is omitted where appropriate because the right side of the vehicle body and the left side of the vehicle body are laterally symmetrical and substantially the same.

First Embodiment

Figure 2:
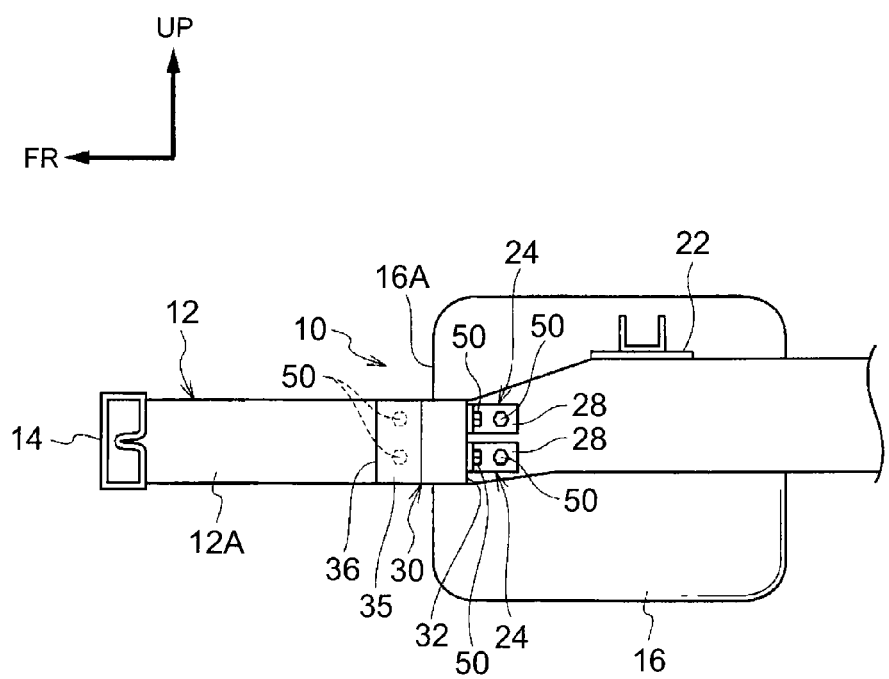
FIG. 2 is an enlarged side view that shows the relevant portion of the vehicle body front structure according to the first embodiment.
Figure 3:
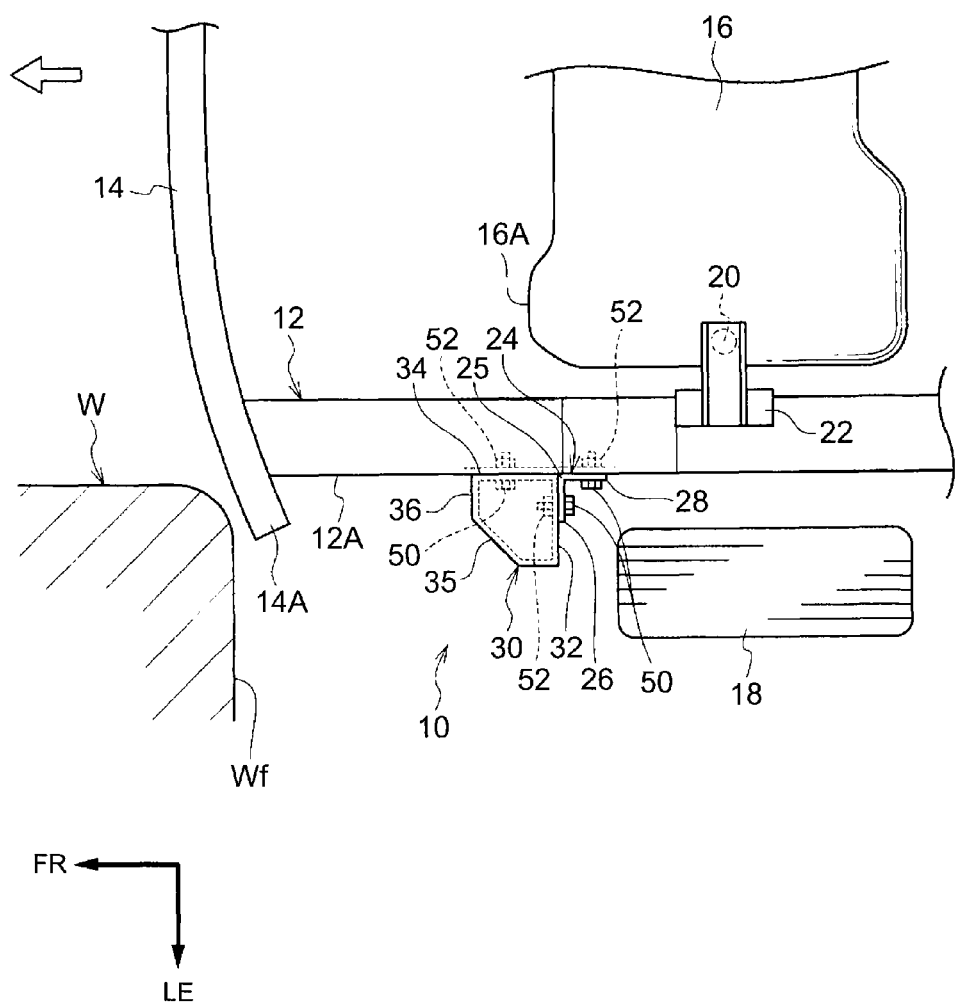
FIG. 3 is a plan view that shows a state of the vehicle body front structure according to the first embodiment before occurrence of a small-overlap collision.

A first embodiment will be described. As shown in FIG. 1 to FIG. 3, a pair of right and left front side members 12 are respectively arranged at the outer sides of the front of the vehicle body in the vehicle width direction. Each of the front side members 12 has a rectangular closed cross-sectional shape, and extends in the vehicle body longitudinal direction. A front bumper reinforcement 14 is provided at the vehicle body front-side end portions of the front side members 12 via brackets (not shown). The front bumper reinforcement 14 has a substantially rectangular closed cross-sectional shape, and extends in the vehicle width direction. Both end portions 14A of the front bumper reinforcement 14 in the vehicle width direction respectively extend outward in the vehicle width direction beyond the right and left front side members 12.

A rectangular closed cross-sectional crush box (not shown) may be provided between each front side member 12 and the front bumper reinforcement 14 so as to be coaxial with the corresponding front side member 12.

As shown in FIG. 2 and FIG. 3, a power unit 16 is arranged between the right and left front side members 12. The power unit 16 includes an engine and a transmission, and at least drives front wheels 18. The power unit 16 is supported by engine mounts 20 respectively provided on the right and left front side members 12.

Each of the engine mounts 20 is formed such that a mount rubber (not shown) that serves as an elastic member is provided between coaxially arranged metal inner tube (not shown) and outer tube (not shown). For example, each inner tube is connected to a corresponding one of the front side members 12 via a bracket 22, and each outer tube is connected to a corresponding one of both right and left end portions of the power unit 16 via a bracket (not shown). In this state, each mount rubber elastically deforms where necessary, with the result that vibrations of the power unit 16 are hard to propagate to the vehicle body (the vibrations are absorbed).

In addition, a metal block-shaped protrusion member 30 is connected to an outer wall 12A via coupling brackets 24. The outer wall 12A is a wall portion at the outer side of each front side member 12 in the vehicle width direction. The protrusion member 30 protrudes outward of the outer wall 12A in the vehicle width direction. The coupling brackets 24 serve as a coupling member. The material of each protrusion member 30 is not limited to a metal, and may be, for example, made of a resin as long as each protrusion member 30 is configured to be able to transmit a load such that lateral force (described later) is generated.

Each protrusion member 30 is formed in a pentagonal shape such that the front end portion of the protrusion member 30 at the outer side in the vehicle width direction is obliquely cut out in plan view, and the obliquely cut out part of a front wall 36 is formed as an inclined surface 35. Through-holes (not shown) for respectively inserting bolts 50 are formed in a planar rear wall (rear end portion) 32 at predetermined positions. Weld nuts 52 that respectively coaxially communicate with the through-holes are provided on the inner surface of the rear wall 32.

Through-holes (not shown) for respectively inserting bolts 50 are formed in the outer wall 12A of the front side member 12 at predetermined positions to the vehicle body rear side of the rear wall 32 of the protrusion member 30. Weld nuts 52 that respectively coaxially communicate with the through-holes are provided on the inner surface of the outer wall 12A.

As shown in FIG. 3, each coupling bracket 24 is formed of a planar metal bent in a substantially L shape in plan view. Through-holes (not shown) for respectively inserting the bolts 50 are respectively formed at one end portion (load receiving surface) 26 arranged on the protrusion member 30 and the other end portion (load transmitting surface) 28 arranged on the front side member 12.

Thus, by communicating the through-hole formed at the one end portion 26 of each coupling bracket 24 with the through-hole formed at the rear wall 32 of the protrusion member 30, inserting the bolt 50 through the through-holes from the vehicle body rear side and screwing the bolt 50 to the corresponding weld nut 52, the one end portion 26 of each coupling bracket 24 is fixedly fastened (coupled) to the rear wall 32 of the protrusion member 30.

Similarly, by communicating the through-hole formed at the other end portion 28 of each coupling bracket 24 with the through-hole formed at the outer wall 12A of the front side member 12, inserting the bolt 50 through the through-holes from the outer side in the vehicle width direction and screwing the bolt 50 to the corresponding weld nut 52, the other end portion 28 of each coupling bracket 24 is fixedly fastened (coupled) to the outer wall 12A of the front side member 12.

The bending strength of a bent portion 25 of each coupling bracket 24 is set so as to be lower than the fastening (coupling) strength of the one end portion 26 with the rear wall 32 of the protrusion member 30 and the fastening (coupling) strength of the other end portion 28 with the outer wall 12A of the front side member 12. Thus, even when a collision load is input to one of the protrusion members 30, the protrusion member 30 is configured to be hard to fall off from the outer wall 12A of the front side member 12.

As shown in FIG. 3, the rear wall (rear end portion) 32 of each protrusion member 30 is arranged on the outer side of the outer wall 12A of the corresponding front side member 12 to the vehicle body rear side of a vehicle body front-side end portion 16A of the power unit 16 in plan view and to the vehicle body front side of a substantially center portion (engine mount 20) of the power unit 16 in the vehicle body longitudinal direction.

When the crush boxes are provided, the front wall (front end portion) 36 of each protrusion member 30 is arranged on the outer side of the outer wall 12A of the corresponding front side member 12 to the vehicle body rear side of the corresponding crush box. Thus, each protrusion member 30 does not interrupt a crush deformation (axial collapse) of the corresponding crush box.

Furthermore, the two coupling brackets 24 shown in the drawing are provided one above the other in the height direction of each protrusion member 30. For example, the (vertical) width of the coupling bracket 24 may be enlarged and only one coupling bracket 24 may be provided at substantially the center portion of each protrusion member 30 in the height direction.

As shown in the drawing, the vehicle body front side of an inner wall 34 of each protrusion member 30, the inner wall 34 facing inward in the vehicle width direction, may be fixedly fastened to the outer wall 12A of the corresponding front side member 12. That is, through-holes for respectively inserting bolts 50 are formed at predetermined positions in the outer wall 12A facing the inner wall 34 are formed, and weld nuts 52 that respectively coaxially communicate with the through-holes are provided on the inner surface of the outer wall 12A.

Through-holes for respectively inserting the bolts 50 may be formed in the inner wall 34 of the protrusion member 30 at predetermined positions, and cylindrical openings (not shown) for screwing the bolts 50 from the outer side in the vehicle width direction may be provided at the inclined surface 35 of the front wall 36 of each protrusion member 30. With this configuration, it is possible to further suppress or prevent each protrusion member 30 from falling off from the outer wall 12A of the corresponding front side member 12 in the event of a small-overlap collision.

A manner of fixing the one end portion 26 of each coupling bracket 24 to the rear wall 32 of the corresponding protrusion member 30 and a manner of fixing the other end portion 28 of each coupling bracket 24 and the inner wall 34 of each protrusion member 30 to the outer wall 12A of the corresponding front side member 12 are not limited to sets of the bolt 50 and the weld nut 52, and may be, for example, an adhesive agent, a rivet, or the like.

Next, the operation of a vehicle body front structure 10 according to the above-described first embodiment will be described.

Figure 4:
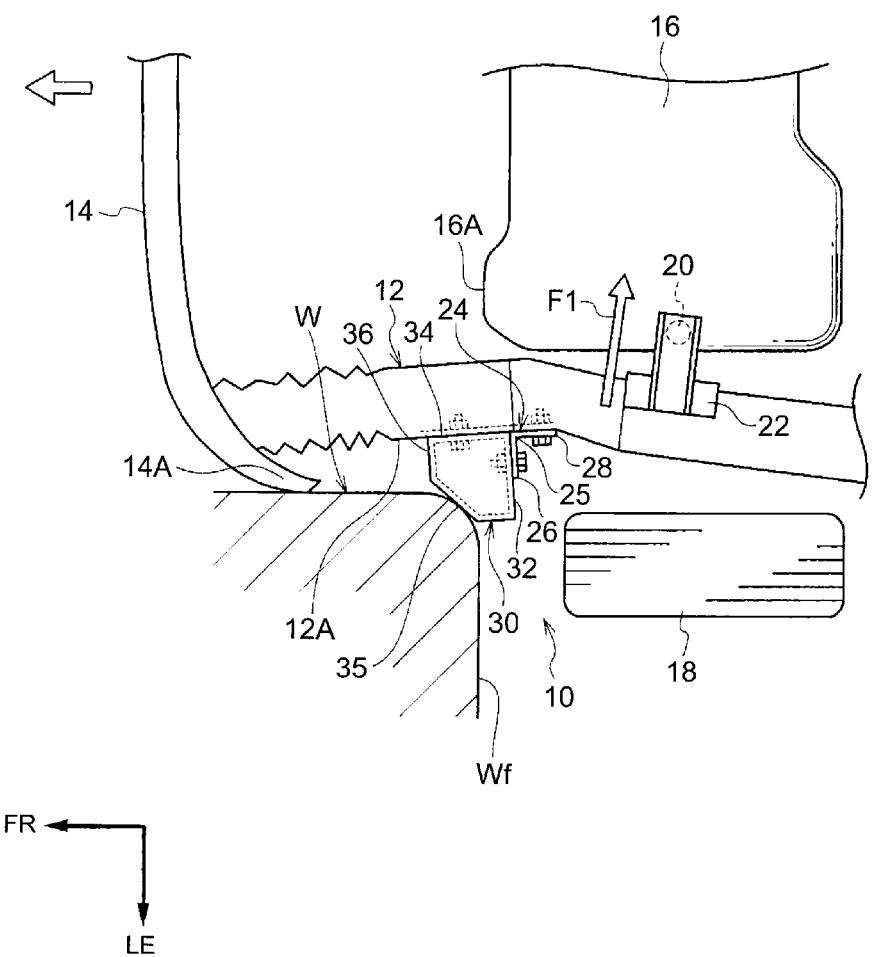
FIG. 4 is a plan view that shows a state of the vehicle body front structure according to the first embodiment after occurrence of a small-overlap collision.

As shown in FIG. 3 and FIG. 4, for example, when there occurs a small-overlap collision in which the outer side to the left front side member 12 of the vehicle in the vehicle width direction, that is, the left end portion 14A of the front bumper reinforcement 14, collides with a barrier W, the corresponding protrusion member 30 that protrudes from the outer wall 12A of the left front side member 12 collides with the barrier W as the vehicle moves forward.

Here, the bending strength of the bent portion 25 of each coupling bracket 24 is set so as to be lower than the fastening strength of the one end portion 26 with the rear wall 32 of the protrusion member 30 and the fastening strength of the other end portion 28 with the outer wall 12A of the front side member 12.

Thus, when the protrusion member 30 has collided with the barrier W, it is possible to receive relative backward movement of the protrusion member 30 with the one end portion 26 of each coupling bracket 24, and it is possible to suppress or prevent a breakage of the shaft portion of the corresponding bolt 50 inserted in the through-hole of the other end portion 28 of each coupling bracket 24 due to relative pressing of the other end portion 28 against the shaft portion of the corresponding bolt 50. Thus, it is possible to suppress or prevent the protrusion member 30 from falling off from the outer wall 12A of the front side member 12.

The rear wall (rear end portion) 32 of the protrusion member 30 is arranged to the vehicle body rear side of the vehicle body front-side end portion 16A of the power unit 16. Thus, part of the collision load input due to the collision of the protrusion member 30 with the barrier W is efficiently transmitted from the protrusion member 30 to the power unit 16 via the front side member 12 and the engine mount 20 (indicated by the arrow F1 in FIG. 4).

Particularly, the protrusion member 30 is formed in a pentagonal shape such that the outer front end portion of the protrusion member 30 in the vehicle width direction is formed into the inclined surface 35 inclined with respect to the vehicle body longitudinal direction and the vehicle width direction. Therefore, the protrusion member 30 efficiently obtains reaction force that acts in the normal direction of the inclined surface 35, that is, component force that acts inward in the vehicle width direction (in this case, rightward), due to the collision of the inclined surface 35 with the barrier W.

Thus, it is possible to easily transmit reaction force received from the barrier W due to the small-overlap collision toward a non-collision side (in this case, rightward) owing to the protrusion member 30, so it is possible to efficiently generate lateral force in the vehicle (force that acts toward the other side of the collision side in the vehicle width direction). Thus, in the event of a small-overlap collision, it is possible to move a vehicle cabin (passenger space) away from the barrier W, so it is possible to suppress or prevent a deformation of the vehicle cabin (passenger space).

Reaction force in the normal direction of the inclined surface 35 acts on the protrusion member 30 in the event of a small-overlap collision, so axial (longitudinal) shear force of the front side member 12, which acts on the other end portion 28 of each coupling bracket 24, is suppressed. Therefore, it is advantageously possible to reduce the fastening strength of the other portion 28 of each coupling bracket 24 with the outer wall 12A of the front side member 12.

The length of each protrusion member 30 in the vehicle width direction may be elongated so as to be larger than that of the one shown in the drawing while the angle of the inclined surface 35 remains unchanged. With this configuration, it is possible to increase an overlap amount of each protrusion member 30 in the vehicle width direction with a planar portion Wf of the barrier W perpendicular to the traveling direction of the vehicle in plan view. Therefore, it is possible to keep reaction force of the inclined surface 35, which is received from the barrier W, and it is possible to increase a collision load that is transmitted to the non-collision side.

When the crush boxes (not shown) are provided, the front wall (front end portion) 36 of each protrusion member 30 is arranged to the vehicle body rear side of the corresponding crush box, so each protrusion member 30 does not interrupt energy absorption that is made by the corresponding crush box in the event of a full-overlap collision or an offset collision. That is, part of a collision load that is input in the event of a full-overlap collision or an offset collision is absorbed by the crush boxes.

Next, the vehicle body front structure 10 according to an alternative embodiment to the first embodiment will be described.

Figure 5:
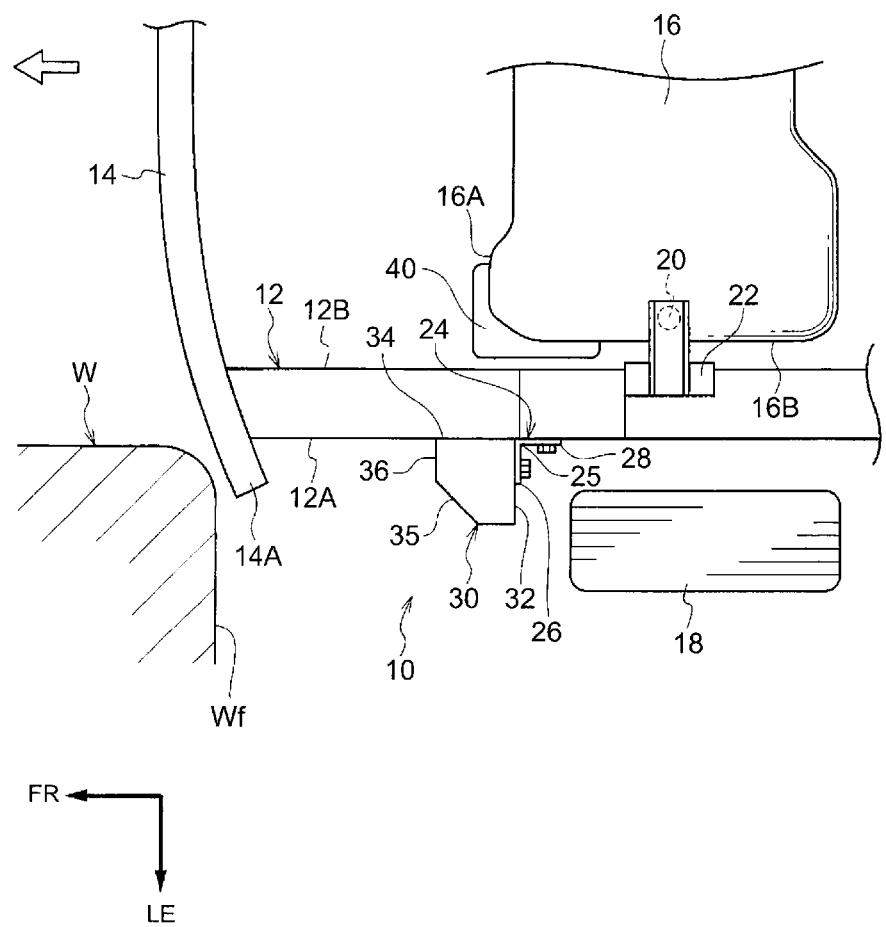
FIG. 5 is a plan view that shows the vehicle body front structure according to the first embodiment in which a spacer is provided on a vehicle body front side at a left side portion of a power unit.

As shown in FIG. 5, a spacer 40 that serves as a load transmitting member may be provided on the vehicle body front side of a left side portion 16B of the power unit 16. The spacer 40 is formed of a resin or a metal in a size such that a clearance is formed in the vehicle width direction from an inner wall 12B. The inner wall 12B is a wall portion at the inner side of the front side member 12 in the vehicle width direction. The clearance is set to a size such that the inner wall 12B can strike the spacer 40 in the event of a small-overlap collision.

The spacer 40 may be provided at a portion (predetermined position) of the inner wall 12B of the front side member 12. The inner wall 12B faces the vehicle body front side of the side portion 16B of the power unit 16 in the vehicle width direction. That is, the spacer 40 just needs to be interposed between the inner wall 12B of the front side member 12 and the vehicle body front side of the side portion 16B of the power unit 16.

With the configuration that the spacer 40 is interposed between the inner wall 12B of the front side member 12 and the vehicle body front side of the side portion 16B of the power unit 16, when the protrusion member 30 collides with the barrier W, part of the collision load is transmitted from the protrusion member 30 to the power unit 16 via the front side member 12 and the spacer 40. Thus, it is possible to early and efficiently transmit part of the collision load to the power unit 16, so it is possible to increase lateral force that is generated in the vehicle in the event of a small-overlap collision.

In addition, as shown in FIG. 6, a bulkhead 42 may be provided inside each front side member 12. Each bulkhead 42 is formed of a metal in a substantially hat shape in plan view, having an opening at the inner side in the vehicle width direction. That is, each bulkhead 42 includes an intermediate plate 42A that is connected to the inner surface of the outer wall 12A of the corresponding front side member 12 by spot welding.

Each bulkhead 42 includes a front plate 42B and a flange portion 42C. The front plate 42B extends inward in the vehicle width direction from the front end portion of the intermediate plate 42A. The flange portion 42C extends toward the vehicle body front side from the inner end portion of the front plate 42B in the vehicle width direction. Furthermore, each bulkhead 42 includes a rear plate 42D and a flange portion 42E. The rear plate 42D extends inward in the vehicle width direction from the rear end portion of the intermediate plate 42A. The flange portion 42E extends toward the vehicle body rear side from the inner end portion of the rear plate 42D in the vehicle width direction.

The flange portion 42C extending from the front plate 42B and the flange portion 42E extending from the rear plate 42D each are connected to the inner surface of the inner wall 12B of the front side member 12 by spot welding. That is, the bulkhead 42 couples the outer wall 12A to the inner wall 12B inside the front side member 12.

A manner of connecting the intermediate plate 42A to the outer wall 12A and a manner of connecting the flange portions 42C, 42E to the inner wall 12B are not limited to spot welding. Each bulkhead 42 is provided at a position at which the flange portion 42C overlaps with the protrusion member 30 in the vehicle body longitudinal direction in plan view.

With the configuration that each bulkhead 42 is provided at the above position, when any one of the protrusion members 30 has collided with the barrier W, part of the collision load is transmitted from the any one of the protrusion members 30 to the power unit 16 via the corresponding bulkhead 42 (front side member 12). Thus, it is possible to early and efficiently transmit part of the collision load to the power unit 16, so it is possible to increase lateral force that is generated in the vehicle in the event of a small-overlap collision.

It is also applicable that the other end portion 28 of each coupling bracket 24 and the intermediate plate 42A of the bulkhead 42 are overlapped via the outer wall 12A and then the other end portion 28 of each coupling bracket 24 and the intermediate plate 42A of the bulkhead 42 are fastened together. That is, it is applicable that through-holes (not shown) for respectively inserting the bolts 50 are formed in the intermediate plate 42A, weld nuts (not shown) that respectively coaxially communicate with the through-holes are provided on the inner surface of the intermediate plate 42A and the bolts 50 are screwed to the weld nuts.

Furthermore, as shown in FIG. 6, it is also applicable that the bracket 22 of each engine mount 20 extends toward the vehicle body front side and then the other end portion 28 of each coupling bracket 24, the intermediate plate 42A of the bulkhead 42 and the bracket 22 are fastened together by the bolts 50 and nuts 54. That is, in this case, through-holes (not shown) for respectively inserting the bolts 50 may also be formed in the inner wall 12B and the bracket 22.

Figure 7A:
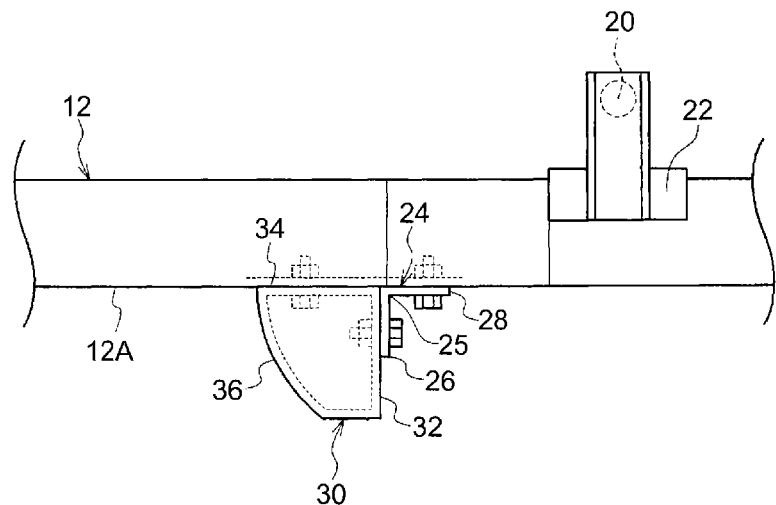
FIG. 7A is a plan view that shows a protrusion member according to an alternative embodiment to the first embodiment.
Figure 7B:
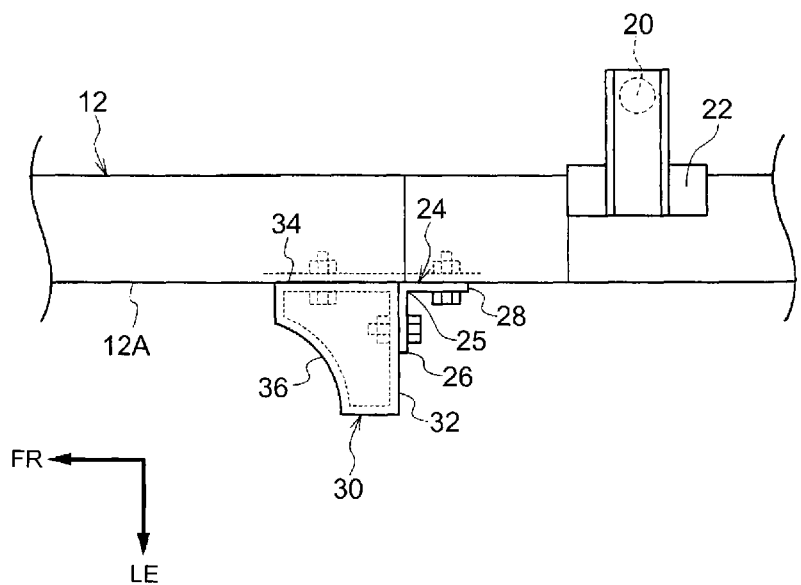
FIG. 7B is a plan view that shows a protrusion member according to an alternative embodiment to the first embodiment.

Each protrusion member 30 is not limited to the shape shown in FIG. 1 to FIG. 6, and may be formed in a shape shown in FIG. 7A or a shape shown in FIG. 7B. That is, as shown in FIG. 7A, each protrusion member 30 may be formed in a shape such that the front wall (front end portion) 36 is convexed in a circular arc shape in plan view. Alternatively, as shown in FIG. 7B, each protrusion member 30 may be formed in a shape such that the front wall (front end portion) 36 is concaved in a circular arc shape in plan view.

As shown in FIG. 7A, when the front wall 36 of each protrusion member 30 is formed in a shape such that the front wall 36 is convexed in a circular arc shape in plan view, it is possible to keep reaction force that is received by the protrusion member 30 from the barrier W for a longer period of time, so it is possible to stabilize constant reaction force. The center of curvature of the front wall 36 in plan view at this time should be, for example, the rear end, or the like, of the other end portion 28 of each coupling bracket 24.

As shown in FIG. 7B, when the front wall 36 of each protrusion member 30 is formed in a shape such that the front wall 36 is concaved in a circular arc shape in plan view, it is possible to control the timing at which the protrusion member 30 receives reaction force from the barrier W, so it is possible to control the timing at which the front side member 12 bends inward in the vehicle width direction.

Although not shown in the drawing, the shape of each protrusion member 30 may be formed in a substantially square shape or substantially rectangular shape in plan view. With this configuration, the front wall 36 is arranged perpendicularly to the outer wall 12A of each front side member 12 in plan view, so it is possible to advance the timing at which the protrusion member 30 collides with the barrier W.

Although not shown in the drawing, the length of the shaft portion of each bolt 50 by which the other end portion 28 of the corresponding coupling bracket 24 is fastened to the outer wall 12A may be formed so as to be larger than the other except FIG. 6 (the shaft portion of each bolt 50 is elongated to such a length that the shaft portion does not extend through the inner wall 12B). With this configuration, it is possible to suppress a crush deformation (axial collapse) of the front side member 12 in the event of a small-overlap collision), so it is possible to suppress the crush deformation by the shaft portion of each bolt 50.

That is, it is possible to facilitate a bending deformation (interference with the power unit 16) of the front side member 12 inward in the vehicle width direction, so it is possible to increase reaction force that is received from the barrier W by the front side member 12 via the protrusion member 30. With this configuration, the length of the shaft portion of each bolt 50 just needs to be elongated, so there is no inconvenience that the number of manufacturing processes or the manufacturing cost increases and there is no inconvenience that production efficiency decreases.

Second Embodiment

Next, a second embodiment will be described. Like reference numerals denote portions equivalent to those of the first embodiment, and the detailed description (including common operations) is omitted where appropriate.

Figure 8:
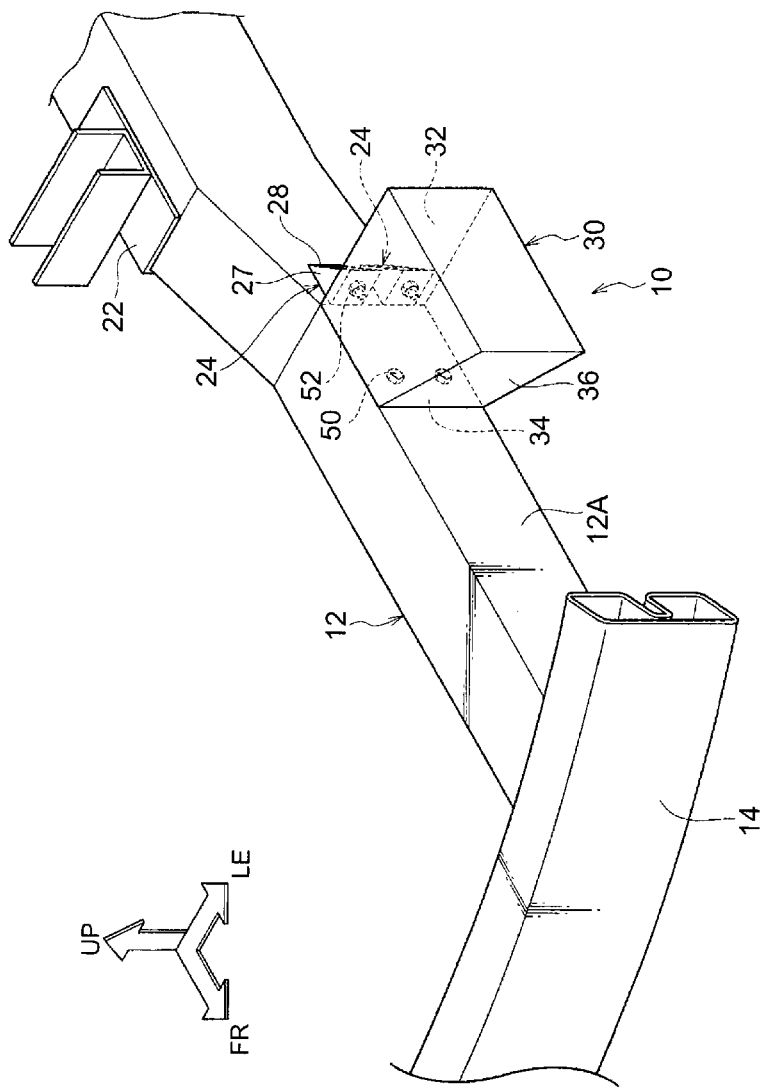
FIG. 8 is an enlarged perspective view that shows a relevant portion of a vehicle body front structure according to a second embodiment.
Figure 9:
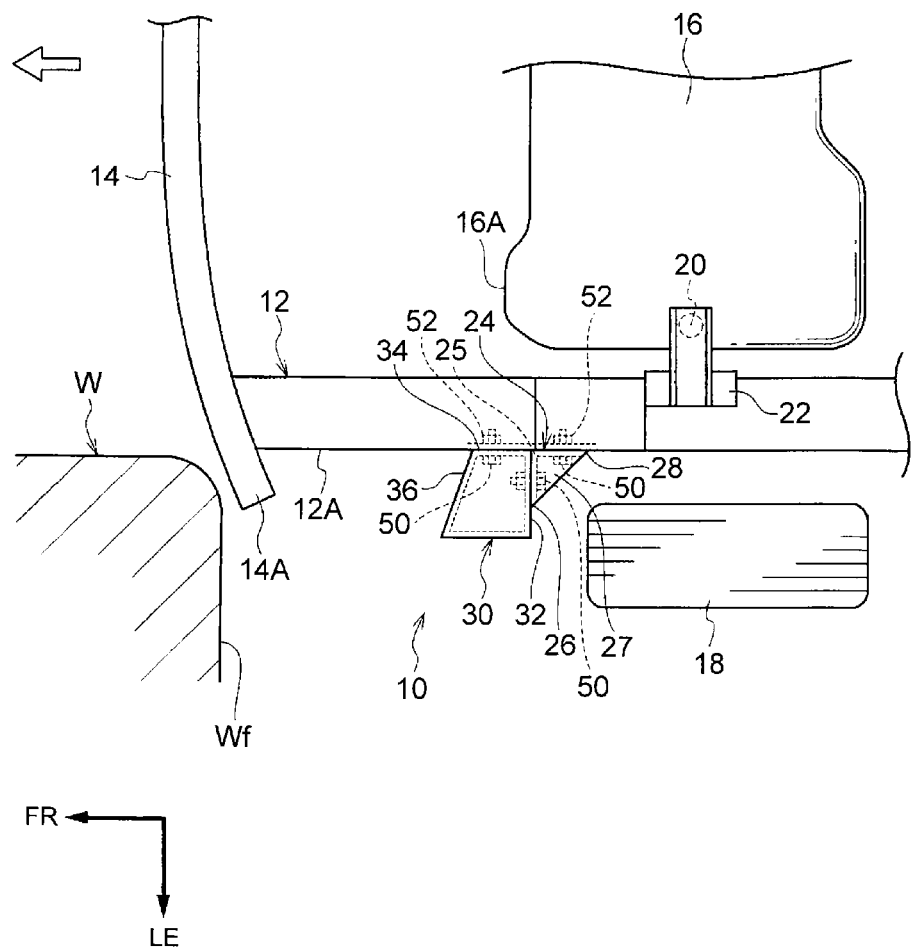
FIG. 9 is a plan view that shows a state of the vehicle body front structure according to the second embodiment before occurrence of a small-overlap collision.

As shown in FIG. 8 and FIG. 9, the front wall (front end portion) 36 of each protrusion member 30 according to the second embodiment is inclined forward and outward of the vehicle body in plan view. Coupling pieces 27 each are integrally formed with the upper edge portion (upper portion) and lower edge portion (lower portion) of a corresponding one of the coupling brackets 24. Each coupling piece 27 has a substantially triangular shape in plan view, and serves as a coupling portion that couples the one end portion 26 to the other end portion 28. Thus, the stiffness (strength) of each coupling bracket 24 is improved.

Figure 10:
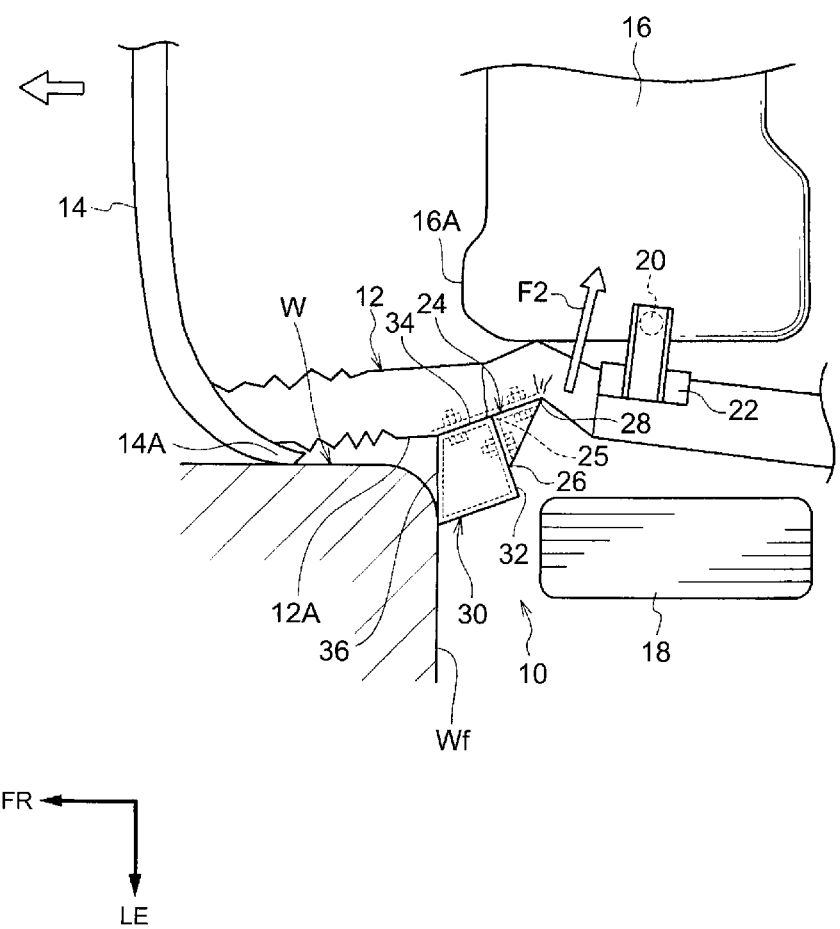
FIG. 10 is a plan view that shows a state of the vehicle body front structure according to the second embodiment after occurrence of a small-overlap collision.

Thus, when there occurs a small-overlap collision in which the left side of the vehicle collides with the barrier W, the front wall 36 of the protrusion member 30 early collides with the barrier W, and, as shown in FIG. 10, the protrusion member 30 is relatively pushed in so as to be pivoted rearward and inward of the vehicle body about a position near the bent portion 25 of each coupling bracket 24. That is, after occurrence of the small-overlap collision, the other end portion (load transmitting surface) 28 of each coupling bracket 24 early presses the front side member 12 rearward and inward of the vehicle body.

Thus, it is possible to effectively facilitate a bending deformation of the front side member 12 inward in the vehicle width direction (it is possible to early generate inward bending moment in the front side member 12), and it is possible to early press the side portion 16B of the power unit 16 inward in the vehicle width direction by the bent front side member 12 (indicated by the arrow F2 in FIG. 10).

Thus, it is possible to easily transmit reaction force that is received from the barrier W due to the small-overlap collision toward the non-collision side (in this case, rightward), so it is possible to early and efficiently generate lateral force (force that acts toward the other side of the collision side in the vehicle width direction) in the vehicle. Therefore, in the event of a small-overlap collision, it is possible to move the vehicle cabin (passenger space) away from the barrier W, so it is possible to suppress or prevent a deformation of the vehicle cabin (passenger space).

Third Embodiment

Lastly, a third embodiment that differs from the first embodiment and the second embodiment in the way of connecting each protrusion member 30 will be described. Like reference numerals denote portions equivalent to those of the first embodiment and second embodiment, and the detailed description (including common operations) is omitted where appropriate.

Figure 11:
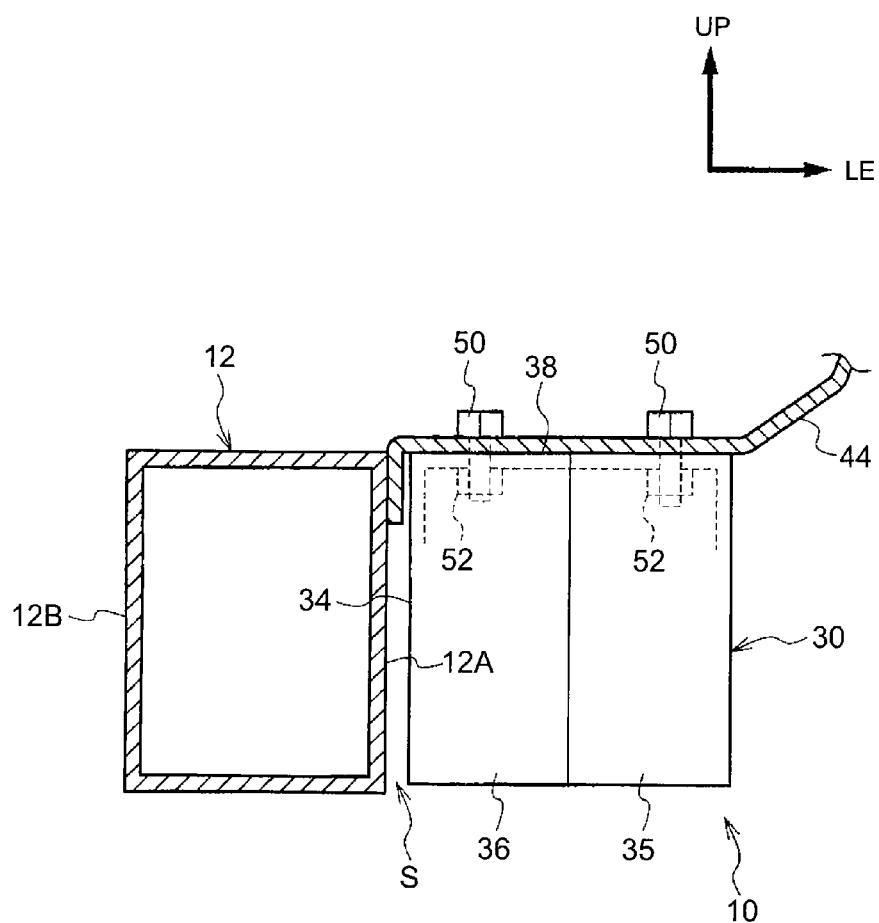
FIG. 11 is an enlarged front cross-sectional view that shows a relevant portion of a vehicle body front structure according to a third embodiment in which a protrusion member is provided on an apron member.
Figure 12:
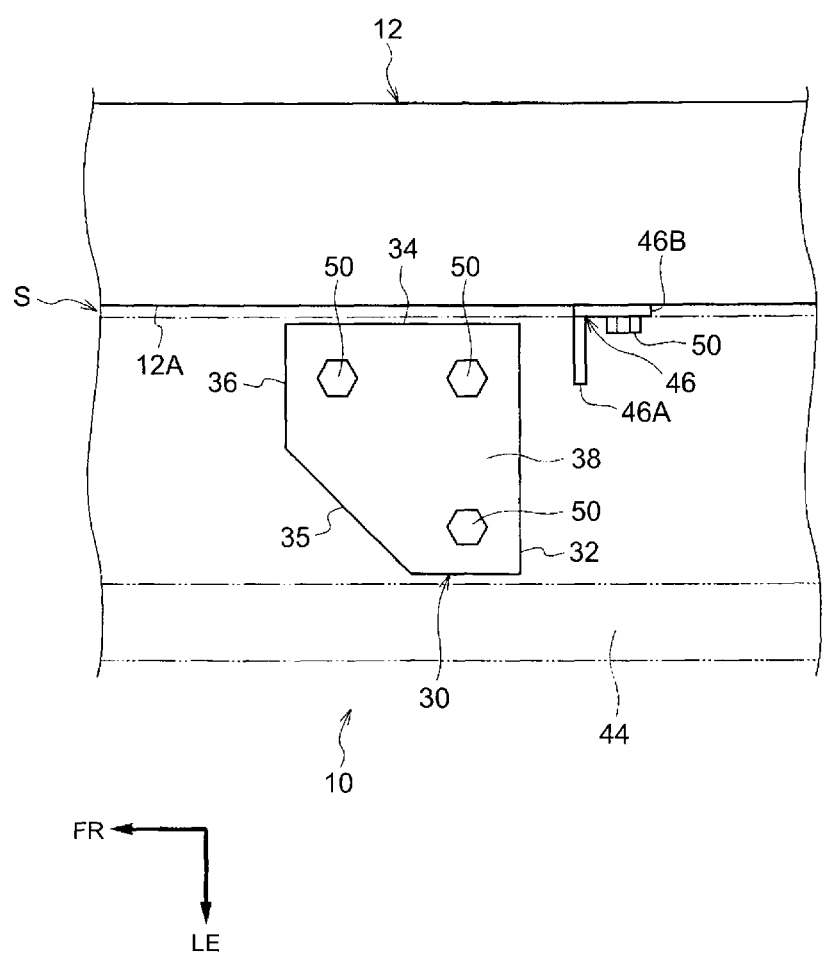
FIG. 12 is an enlarged plan view that shows the relevant portion of the vehicle body front structure according to the third embodiment in which the protrusion member is provided on the apron member.

As shown in FIG. 11 and FIG. 12, each protrusion member 30 is not fixedly fastened to the outer wall 12A of the corresponding front side member 12 by the corresponding coupling brackets 24, but each protrusion member 30 is fixedly fastened to an apron member 44 arranged at the outer upper portion of the corresponding front side member 12 in the vehicle width direction, and is arranged to the outer side of the outer wall 12A of the corresponding front side member 12.

That is, a plurality of (for example, three) through-holes (not shown) for respectively inserting bolts 50 are formed in an upper wall 38 of each protrusion member 30, and weld nuts 52 that respectively coaxially communicate with the through-holes are provided on the inner surface of the upper wall 38. A plurality of (for example, three) through-holes (not shown) for respectively inserting the bolts 50 are formed in the apron member 44.

Thus, each protrusion member 30 is arranged on the lower surface of the apron member 44 to communicate the through-holes with the corresponding through-holes, the bolts 50 are inserted from the vehicle body upper side through the through-holes and respectively screwed to the weld nuts 52. Thus, each protrusion member 30 is fixedly fastened to the lower surface of the apron member 44.

Thus, each protrusion member 30 is configured to be arranged at a predetermined clearance S to the outer side of the outer wall 12A of the corresponding front side member 12. With this configuration, when there occurs a small-overlap collision in which the left side of the vehicle collides with the barrier W, it is possible to suppress or prevent the protrusion member 30 from interrupting a crush deformation (axial collapse) of the front side member 12.

A stopper member 46 is provided at the outer wall 12A of each front side member 12 to the vehicle body rear side of the corresponding protrusion member 30. That is, the stopper member 46 is formed in a planar shape bent in a substantially L shape in plan view, the other end portion (load transmitting surface) 46B is fixedly fastened to the outer wall 12A at a predetermined position by bolts 50 and weld nuts (not shown) such that one end portion (load receiving surface) 46A is arranged at a predetermined clearance in the vehicle body longitudinal direction from the rear wall 32 of the protrusion member 30.

With the above stopper member 46, even when there occurs a small-overlap collision in which the left side of the vehicle collides with the barrier W and the protrusion member 30 collides with the barrier W and is relatively moved backward, it is possible to suppress the backward movement of the protrusion member 30. That is, it is possible to stably control the behavior of each protrusion member 30 with the use of the corresponding stopper member 46.

Thus, as in the case of the first embodiment, part of the collision load input due to the collision of the protrusion member 30 with the barrier W is efficiently transmitted from the protrusion member 30 to the power unit 16 via the front side member 12 and the engine mount 20. A manner of fixing each protrusion member 30 to the corresponding apron member 44 is not limited to the bolts 50 and the weld nuts shown in the drawing, and may be, for example, an adhesive agent, a rivet, or the like.

The vehicle body front structure 10 according to the present embodiments is described with reference to the drawings; however, the vehicle body front structure 10 according to the present embodiments is not limited to the illustrated ones. The vehicle body front structure 10 may be changed in design as needed without departing from the scope of the invention. For example, in the first embodiment, the coupling pieces 27 each having a substantially triangular shape in plan view and each couples the one end portion 26 to the other end portion 28 may be integrally formed with the upper edge portion and the lower edge portion of the corresponding coupling bracket 24.

The bending strength of the bent portion 25 of each coupling bracket 24 is not limited so as to be lower than the fastening strength of the one end portion 26 with the rear wall 32 of the protrusion member 30 and the fastening strength of the other end portion 28 with the outer wall 12A of the front side member 12. As long as a configuration is able to transmit a load to the power unit 16, the rear wall (rear end portion) 32 of each protrusion member 30 does not need to be located to the vehicle body rear side of the vehicle body front-side end portion 16A of the power unit 16 in plan view. The vehicle body front structure 10 according to the present embodiments is formed laterally symmetrical; instead, the vehicle body front structure 10 does not need to be laterally symmetrical.

What is claimed is:

1. A vehicle body front structure comprising:
   a front side member arranged in a vehicle body longitudinal direction at an outer side of a front of a vehicle body in a vehicle width direction;
   a protrusion member provided on or to an outer wall of the front side member so as to protrude outward of the outer wall in the vehicle width direction, a rear end portion of the protrusion member being located to a vehicle body rear side of a vehicle body front-side end portion of a power unit arranged to an inner side of the front side member in the vehicle width direction in plan view; and
   a coupling member having one end portion connected to the rear end portion of the protrusion member and the other end portion connected to the outer wall of the front side member to a vehicle body rear side of the rear end portion,
   wherein the protrusion member is spaced from a front wheel of the vehicle and is spaced from a front bumper reinforcement, and the protrusion member is disposed between the front wheel of the vehicle and the front bumper reinforcement in the vehicle longitudinal direction,
   wherein the protrusion member includes an inner wall portion extending in the vehicle body longitudinal direction and facing the outer wall of the front side member, and a front end portion projecting from the inner wall portion of the protrusion member, and
   wherein the rear end portion of the protrusion member projects from the inner wall portion of the protrusion member in the vehicle width direction.

2. The vehicle body front structure according to claim 1, wherein
   a bending strength of the coupling member is set so as to be lower than a coupling strength of the one end portion with the rear end portion of the protrusion member and a coupling strength of the other end portion with the outer wall of the front side member.

3. The vehicle body front structure according to claim 1, wherein
   a front end portion of the protrusion member is inclined forward and outward of the vehicle body in plan view, and coupling portions each coupling the one end portion to the other end portion are respectively formed at an upper portion and lower portion of the coupling member.

4. The vehicle body front structure according to claim 1, further comprising:
   a load transmitting member provided on one of a vehicle body front side at a side portion of the power unit and an inner wall of the front side member, the inner wall facing the side portion in the vehicle width direction.

5. The vehicle body front structure according to claim 1, wherein
   the front end portion of the protrusion member is formed in a shape such that the front end portion is convexed in plan view.

6. The vehicle body front structure according to claim 1, wherein
   the front end portion of the protrusion member is formed in a shape such that the front end portion is concaved in plan view.

7. The vehicle body front structure according to claim 1, wherein
   the inner wall portion of the protrusion member abuts the outer wall of the front side member.

8. The vehicle body front structure according to claim 4, wherein
   the load transmitting member includes a first flange portion abutting the outer wall of the front side member, a second flange portion abutting the inner wall of the front side member, a third flange portion abutting the inner wall of the front side member, a front plate connecting the first flange portion and the second flange portion, and a rear plate connecting the first flange portion and the third flange portion.

* * * * *